May 20, 1924.　　　　　C. P. RANDOLPH　　　　　1,494,627
VEHICLE SPRING
Filed April 4, 1921　　　2 Sheets-Sheet 1
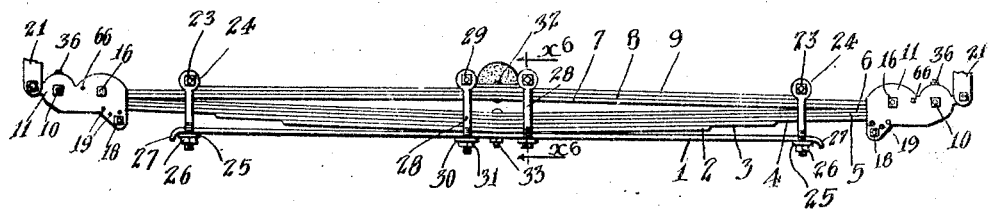
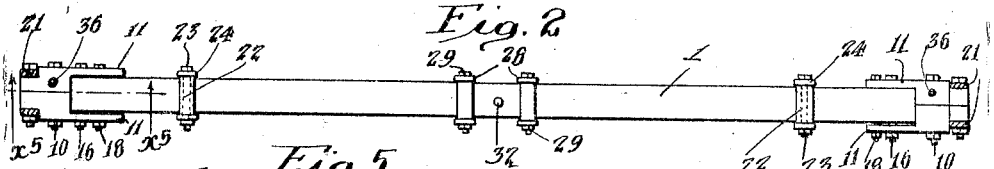
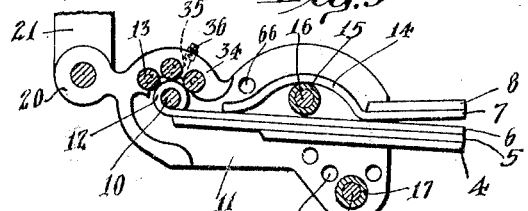
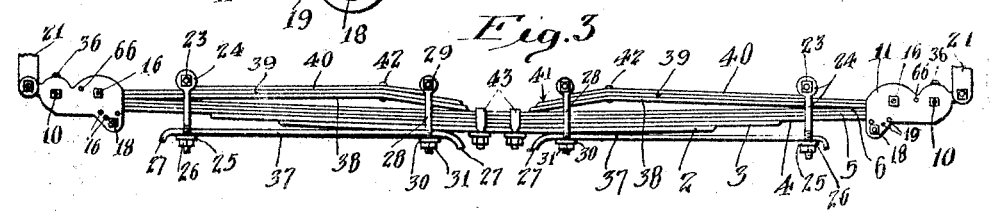
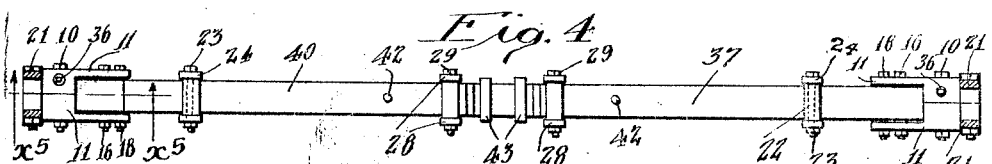
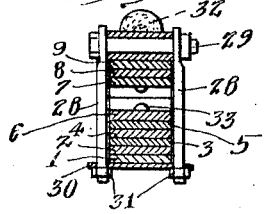
Inventor
Claborn P. Randolph.
By
Attorney May 20, 1924.
C. P. RANDOLPH
VEHICLE SPRING
Filed April 4, 1921   2 Sheets-Sheet 2
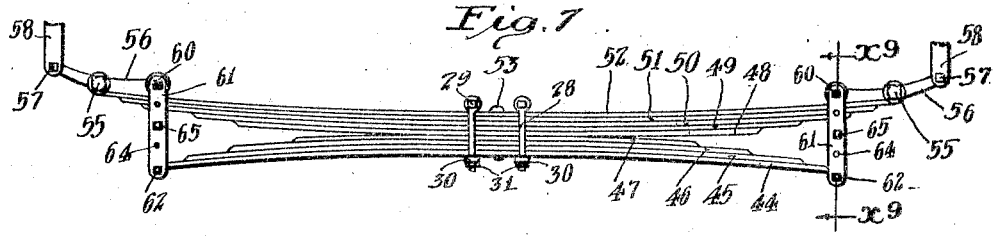
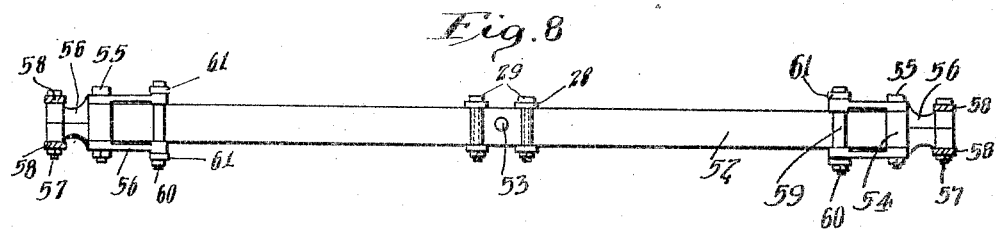
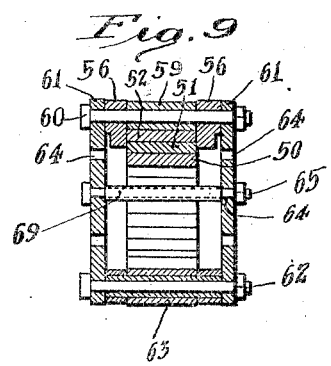
Inventor
Claborn P. Randolph
By Frederick Whyper
Attorney Patented May 20, 1924.

1,494,627

UNITED STATES PATENT OFFICE.

CLABEORN P. RANDOLPH, OF EL CENTRO, CALIFORNIA.

VEHICLE SPRING.

Application filed April 4, 1921. Serial No. 458,493.

*To all whom it may concern:*

Be it known that I, CLABEORN P. RANDOLPH, a citizen of the United States, and a resident of El Centro, in the county of Imperial and State of California, have invented certain new and useful Improvements in Vehicle Springs, of which the following is a specification.

This invention relates to leaf springs of the character used to connect the chassis of a vehicle with the body thereof, to absorb shocks incident to travel upon the roadway, and refers more especially to that type of which the more yielding member is effective to resist lighter loads and shocks and the stiffer member is effective to resist heavier loads and shocks.

One of the principal objects of the invention is to provide for easy riding qualities of a vehicle under different loads.

Another object is to produce division of the load on the different portions of the spring by means of the spring shackle.

Another object is to provide for heavy loading or overload of the spring as well as for light loading, and at the same time to retain maximum resiliency of the spring for light loading. This is effected in this spring by the shackle and reversed leaf or leaves of the spring.

Another object is to provide for tension adjustments whereby the user, though he be inexpert in mechanics, can adjust the spring for different loadings.

Another object is to so construct the spring that complete break-down is avoided, the spring in itself taking care of the breakage of one or more leaves.

Another object is to provide for quick temporary repair in case of breakage, and this is effected by adjustment of the clamps or reversal of the upper spring series.

Another object is to make provision in the spring itself for checking the recoil or backlash of the spring after it has been compressed by a shock.

Another object is to provide the spring with double joints and loose roller bearing action.

Another object is to provide for an auxiliary spring of which the tension acts on downward as well as upward movement of the load on the spring.

The accompanying drawings illustrate several embodiments of the invention:

Figure 1 is a side elevation of a spring embodying the invention in one form, fragments of shackles also being shown.

Figure 2 is a plan view of Figure 1, the shackles being in section.

Figure 3 is a side elevation of a spring embodying a different form of the invention, fragments of shackles also being shown.

Figure 4 is a plan view of Figure 3, the shackles being in section.

Figure 5 is an enlarged detail of one end of the spring, partly in section on line indicated by $x^5$—$x^5$, Figures 2 and 4.

Figure 6 is an enlarged detail partly in section on line indicated by $x^6$—$x^6$, Figure 1.

Figure 7 is a side elevation of a spring embodying a still different form of the invention, fragments of shackles also being shown.

Figure 8 is a plan view of Figure 7, the shackles being in section.

Figure 9 is an enlarged sectional elevation on line indicated by $x^9$—$x^9$, Figure 7.

Referring first to the form of the invention shown in Figures 1 and 2, there are provided a lower series of spring leaves and an upper series. The number of leaves in the two series may be varied according to the strength and stiffness of spring desired. In this instance the lower series is the stiffer and comprises leaves 1, 2, 3, 4, 5 and 6, and the upper series is floating and is the more yielding and comprises leaves 7, 8, and 9. The term "floating spring member" employed in this specification defines a spring member that is free from engagement with the vehicle body and axle and is shiftable endwise relative to the other spring member with which it is associated and cooperates. The upper and lower series excepting the leaf 1 are bowed away from each other so as to normally be spaced apart excepting at their opposite ends. The spring leaf 1 is constructed to expand in the same direction as the leaves of the upper series.

The opposite ends of the lower series of spring leaves are connected by pivots 10 to levers 11, each lever, in this instance, being constructed in halves or sections and the pivots 10 being formed by bolts. In this instance the leaf 6 is the one that is connected with the pivots and for this purpose it is provided with eyes 12 through which the pivots extend. The ends of the pivots 10 rest in the opposite halves of the levers. Journaled in each lever are rollers 13 which form a roller bearing for the adjacent end of the lower series of spring leaves. The opposite ends of the spring leaf 7 are bowed upwardly as indicated at 14, and rest upon rollers 15 which are mounted on bolts 16 supported in the levers 11. Thus the opposite ends of the upper series are supported on roller bearings and the rollers 15 constitute abutments adapted to engage the lower spring leaf series when the inner ends of the levers are swung downward.

Each lever 11 is provided with a second abutment which, in this instance, is in the form of a roller 17 mounted on a bolt 18 supported by the lever. The bolt is selectively placed in any one of a series of holes 19 provided in the lever so that the abutment 17 can be spaced various distances from the lower series of spring leaves. One end of each lever is provided with an eye 20 or is otherwise constructed for connection with the chassis of the vehicle. For this purpose shackles 21 are shown in the drawing.

The spring leaf 9 is provided at its opposite ends with eyes 22 through which extend bolts 23. The bolts 23 also pass through the eyes of eye bolts 24, forming links, and the links at each end are connected with each other by cross members 25 held in place by nuts 26 on the eye bolts. The cross members 25 are positioned beneath the opposite ends of the spring leaf 1 which preferably has its opposite ends downwardly bent as indicated at 27, to prevent the cross members slipping from beneath said leaf as the spring works. From this it is clear that the opposite ends of the spring leaf 1 bear upon the cross members 25 and are connected with the upper spring leaf 9.

The upper and lower series of spring leaves excepting the leaf 1, when manufactured, are bowed away from each other so that when assembled as in Figure 1 they are under some tension. The upper and lower series are prevented from bowing away from each other more than a predetermined distance by reason of eye bolts 28 arranged in pairs, the eyes of each pair of bolts being connected together by a cross bolt 29 and the lower ends of the eye bolts of each pair being connected by a cross member 30 held in place by nuts 31 on the eye bolts. The spring leaves are interposed between the bolts 29 and cross members 30. The leaves of the upper series are riveted or otherwise fastened together near their middle as indicated at 32, and the leaves of the lower series are fastened together near their middle by a bolt 33 or its equivalent.

Each lever 11 is provided with a top portion or cover 34 in which the rollers 13 are journaled and said cover is provided with an oil duct 35 normally closed by a plug 36. The oil duct extends through the cover 34 to a point immediately over the eye 12 so that oil fed to the duct will spread upon the eye 12 where said eye comes into contact with the rollers 13. Each lever 11 is provided with holes 66 of which the utility will be explained hereinafter, said holes being just above the spring bows 14.

This spring operates as follows: Assuming, for example, that the vehicle, beneath which the spring is placed, is lightly loaded, the load will be imposed more directly upon the lower series of spring leaves through the bolts 10, but when shocks come upon the vehicle, or upon the wheels of the vehicle, the eyes 20 of the lever 11 will be suddenly forced downwardly. The lower spring leaf series being the stiffer will support the bolts 10 which act as fulcrums for the levers and permit the levers to turn about said bolts so that the inner ends of the levers will swing upwardly, thus carrying with them the rollers 15 and the ends of the upper spring leaf series. Thus, though the load be light, it is actually supported by a very stiff spring, but the shocks are in reality absorbed more by the more yielding upper spring series than by the stiffer lower spring series.

In event of the vehicle being heavily loaded, a portion of the load will be resisted by the upper spring leaf series just the same as said upper series resists the shocks when the vehicle is lightly loaded. The lighter shocks transmitted to the vehicle spring, when the vehicle is heavily loaded, will be largely absorbed by the upper spring leaf series, and the lower series will aid in absorbing relatively heavy shocks.

When the spring is heavily loaded, or at least when heavy shocks occur while the spring is heavily loaded, the upward movement of the inner end of the levers 11 causes the abutments 17 to engage the under side of the spring leaf 4 to cause compound flexure of the lower spring leaf series. This, of course, stiffens the resistance to the heavier loads or shocks.

Upon rebound or back lash of the spring, after the shock has occurred as above described, there is a tendency for the outer ends of the levers 11 to be swung upwardly beyond their normal level relative to the pivots 10, thus causing the abutment 15 to engage the upper face of the spring leaf 6 to produce compound flexure of the lower spring leaf series in a direction opposite to that caused, as just described, on receiving the shock. Thus the lower spring leaf series acts in both directions, first to absorb the initial shock and, second, to absorb the rebound or back lash of the spring due to the tendency of the spring to recover its normal position after compression by shock.

It is to be noted that the relatively minute vibrations that ordinarily occur in motor cars, when riding along the road, are readily absorbed by a comparatively light spring, whether the vehicle be lightly or heavily loaded.

If the leaves of the lower spring member or series break, the nuts 31 will be tightened up to tightly clamp the upper and lower series together and bolts, not shown, will be inserted in the holes 66 of the levers 11 to prevent pivotal movement of the levers, so that the upper series will positively connect through the levers with the shackles 21 and thus serve to yieldingly support the body of the vehicle. Thus a temporary splice is effected, with very little trouble and delay, until the end of the trip is reached and repairs can be conveniently made.

Now referring more particularly to the form of the invention shown in Figures 3 and 4, the elements that correspond in construction and function to those above described will be designated by the same reference characters and are as follows: the spring leaves 2 to 6, inclusive, the bolts 10, the levers 11, the eyes 12, the rollers 13, the bows 14, the rollers or abutments 15, the bolts 16, the rollers or abutments 17, the bolts 18, holes 19, eyes 20, shackles 21, eyes 22, bolts 23, eye bolts 24, cross members 25, nuts 26, curved ends 27, eye bolts 28, bolts 29, cross members 30, nuts 31, covers 34, oil ducts 35, plugs 36 and holes 66.

The lower spring leaf series is formed in part by the leaves 2 to 6, inclusive, and partly by the spring leaves 37 arranged in endwise alinement, the cross members 26 engaging beneath the outer ends of the leaves 37 and the cross members 30 engaging beneath the inner ends of said leaves. The inner ends of the leaves 37 are curved as indicated at 67 to prevent the leaves 37 pulling from between the leaf 2 and cross members 30.

In this form of the invention the upper spring leaf series is not continuous as in Figure 1, but is formed in two separate sections or halves, the leaves of each section being indicated at 38, 39 and 40. The inner ends of the upper spring leaf series are downwardly bent as indicated at 41 so as to rest upon the upper face of the spring leaf 6, thus spacing the upper series of spring leaves from the lower series excepting at the opposite ends of the upper series. The upper series of spring leaves in both sections are held together by rivets 42 or their equivalents, and the leaves 2 to 6, inclusive, are fastened together near their middle by U-bolts 43 or their equivalents. In this form of the invention it is the spring leaf 38 that is provided with the bows 14 for engaging the rollers 15, and the spring leaves 40 are provided with the eyes 22 for engaging the bolts 23.

The operation of the spring just described will be understood from the description of the operation of the form of spring shown in Figures 1 and 2, since the action is substantially the same.

Now referring to Figures 7, 8 and 9, there are shown an upper and a lower series of spring leaves, the leaves of the lower series being indicated at 44, 45, 46 and 47; and the leaves of the upper series being indicated at 48, 49, 50, 51 and 52. Each series may be formed of any desired number of leaves according to the stiffness of the spring desired, and in the particular instance shown the upper series is the stiffer of the two. All of the leaves may be suitably fastened together at their middle portions by a rivet 53 or its equivalent. When the spring is manufactured the two series of leaves are normally bowed away from each other by a greater amount than is shown in Figure 6 so as to be under tension when assembled.

The opposite ends of the spring leaf 52 are provided with eyes 54 through which pass bolts 55, the opposite ends of said bolts being supported by levers 56 and the bolts 55 forming the pivots or fulcrums of said levers. In this particular instance the levers 56 are formed in halves or sections. The outer ends of the levers may be connected by bolts 57 or other suitable means to the vehicle, and in this particular instance said bolts connect the levers with shackles 58 shown fragmentarily in the drawings.

The inner ends of the levers 56 are provided with abutments formed by rollers 59 adapted to engage the upper face of the leaf 52 when the outer ends of the levers are moved upwardly relative to the pivots 55. The rollers 59 are mounted on bolts 60 supported at their opposite ends in the opposite sides of the levers 56. The bolts 60 also pivotally connect links 61 to the levers 56.

The links 61 are arranged in pairs and extending between the lower ends of the links of each pair is a bolt 62, the bolt passing through an eye 63 formed on one end of the spring leaf 44. The links 61 of each pair are provided between the bolts 60 and 62 with a series of holes 64 adapted to be selectively engaged by a bolt 65 journaling a roller 69 which constitutes an abutment to engage the under face of the upper spring leaf series when the outer end of the lever 56 is moved downwardly relative to its pivot 55.

The spring just described operates as follows: Assuming that the vehicle supported on the spring is lightly loaded and that under such conditions the rollers 59 are spaced from the spring leaf 52, the load is imposed upon both series of spring leaves, but, since the upper series is the stiffer, when a relatively light shock comes upon the wheels such shock is absorbed mainly by the lower spring leaf series. When the shock comes the outer ends of the levers 56 are forced upwardly, thus tending to flex the upper spring series, but because the lower series is less stiff said lower series will be flexed. When, however, a heavier shock is transmitted to the outer ends of the levers 56, not only will the rollers 59 engage the upper spring leaf series and flex the lower spring leaf series, but the force of the shock causes compound flexure of the upper spring leaf series, much after the manner in which the lower series is flexed in the forms of the invention shown in Figures 1 to 6, inclusive. When the spring is heavily loaded, the rollers 59 will normally engage the upper series, and hence both series will function to absorb shocks transmitted through the levers 56.

Upon rebound or back lash of the spring, subsequent to its flexure under shock, the tendency of the outer ends of the levers 58 is to be deflected below their normal levels relative to the pivots 55, thus tending to move the links 61 upwardly so as to exert an upward pull upon the ends of the lower spring leaf series. The lower spring leaf series being the less stiff, it will flex until the rollers 69 engage the under face of the upper series, whereupon the resistance of the upper series will become effective to still further absorb the rebound action and neutralize the same. It is clear that the rollers 69 may be readily adjusted toward and from the upper spring leaf series according to the degree of flexure of the lower series it is desired to permit before the upper series come into action to resist the rebound.

It will be clear from the foregoing that in all of the forms of the spring disclosed a lever is pivoted to one end of a spring leaf and is provided with abutments both above and below the leaf adapted to be respectively moved toward the leaf when the lever is turned in opposite directions, and that means are provided to yieldingly hold the lever against turning in either direction, said means being the upper and lower leaf series in Figures 1 to 6 and being the lower series in Figures 7 to 9. It is also clear that the upper series in Figures 7 to 9 yieldingly holds the levers against turning in one direction, when the rollers 59 are engaged with the upper series. In Figures 1 to 6, when the rollers 15 are engaged with the lower series, said lower series yieldingly holds the levers against turning in one direction.

I claim:

1. In a vehicle spring, a spring leaf, a lever pivoted to one end of said leaf and provided near one end with an abutment adapted to be moved toward the leaf when the lever is turned in one direction, and a floating spring leaf yieldingly holding the lever against such turning.

2. In a vehicle spring, a spring leaf, a lever pivoted to one end of said leaf and provided near one end with an abutment adapted to engage the leaf when the lever is turned in one direction, and a floating spring leaf yieldingly holding the lever against turning in the opposite direction.

3. In a vehicle spring, a spring leaf, a lever pivoted to one end of said leaf and provided near one end with an abutment adapted to be moved toward the leaf when the lever is turned in one direction, and a floating spring leaf yieldingly holding the lever against such turning and against turning in the opposite direction.

4. In a vehicle spring, a spring leaf, a lever pivoted to one end of said leaf and provided near one end with abutments above and below the leaf adapted to be respectively moved toward the leaf when the lever is turned in opposite directions, and means yieldingly holding the lever against turning in one direction.

5. In a vehicle spring, a spring leaf, a lever pivoted to one end of said leaf and provided near one end with abutments above and below the leaf adapted to be respectively moved toward the leaf when the lever is turned in opposite directions, and means yieldingly holding the lever against turning in either direction.

6. In a vehicle spring, a spring leaf, a lever pivoted to one end of said leaf and provided near one end with an abutment adapted to be moved toward the leaf when the lever is turned in one direction; and a second leaf spring connected with the lever and yieldingly holding the lever against turning in the opposite direction.

7. In a vehicle spring, a spring leaf, a lever pivoted to one end of said leaf and provided near one end with an abutment adapted to be moved toward the leaf when the lever is turned in one direction and provided with a second abutment adapted to be moved toward the leaf when the lever is turned in the opposite direction, and a second leaf spring connected with the lever and yieldingly holding the lever against turning in said opposite direction.

8. In a vehicle spring, a spring leaf, a lever pivoted to one end of said leaf and provided near one end with an abutment adapted to be moved toward the leaf when the lever is turned in one direction, and a second leaf spring having one end resting on the abutment and tending to press said abutment toward the first named leaf.

9. In a vehicle spring, a spring leaf, a lever pivoted to one end of said leaf and provided near one end with an abutment and a second leaf spring having one end loosely resting on the abutment.

10. In a vehicle spring, a spring leaf, a lever pivoted to one end of said leaf and provided near one end with a roller, and a second leaf spring having one end loosely resting on said roller.

11. In a vehicle spring, a series of spring leaves, means for connecting the opposite ends of said series to a vehicle chassis, a lever pivoted to one end of one of the leaves of said series, and another spring leaf connected with the lever, the middle portion of the first leaves being secured to the second named leaf and the first and second named leaves being constructed to expand in the same direction as one another.

12. In a vehicle spring, a series of spring leaves, a second series of spring leaves, the first and second series being constructed to expand in opposite directions, means whereby a load may be imposed on the series, a lever pivoted to one end of one of the leaves of the first series, and another spring leaf connected with the lever and positioned adjacent the second series and being constructed to expand in the same direction as the first series.

13. In a vehicle spring, a spring leaf having an eye, a lever pivoted to the eye, rollers journaled in the lever and engaging the eye, and a floating spring leaf yieldingly holding the lever against turning.

14. In a vehicle spring, a spring leaf having an eye, a member pivoted to the eye, and rollers journaled in the member and engaging the eye, said member being connected by means including a floating spring member to a vehicle chassis.

15. In a vehicle spring, a spring leaf, a lever pivoted to the spring leaf and provided with an abutment adapted to be moved toward the spring leaf by turning of the lever in one direction, a second spring leaf having one end engaging the abutment and having its opposite end bent to engage the middle portion of the first spring leaf, the intermediate portion of the second leaf being bowed away from the first leaf, and means holding the bent end of the second leaf toward the first leaf.

16. In a vehicle spring, a spring leaf, a lever pivoted to one end of the spring leaf and provided with an abutment at its inner end adapted to engage the spring leaf, a second spring leaf constructed to normally exert its power in a direction opposite to the first spring leaf, and means connecting the second spring leaf to the inner end of the lever.

17. In a vehicle spring, a spring leaf, a lever pivoted to one end of the spring leaf and provided with an abutment adapted to engage said leaf when the lever is turned in one direction, a second spring leaf, and means connecting the second spring leaf to the lever, the second spring leaf being constructed to exert its power to tend to turn the lever in a direction to move the abutment toward the first spring leaf.

18. In a vehicle spring, a spring leaf, a lever pivoted to one end of the spring leaf and provided with an abutment adapted to engage said leaf when the lever is turned in one direction, a second spring leaf, means connecting the second spring leaf to the lever, the second spring leaf being constructed to exert its power to tend to turn the lever in a direction to move the abutment toward the first spring leaf, and a second abutment on said connecting means adapted to be moved toward the first leaf when the lever is turned in the opposite direction.

19. In a vehicle spring, two different strength series of spring leaves constructed to expand in opposite directions, means to connect both ends of both series to a vehicle frame and permitting relative endwise movement between the series, one of the series being free at its middle portion to expand and contract relative to the other series, and means connecting the series to limit relative expansive movement.

20. In a vehicle spring, two different strength series of spring leaves constructed to expand in opposite directions, means to connect both ends of both series to a vehicle frame and permitting relative endwise movement between the series, one of the series being free at its middle portion to expand and contract relative to the other series, means connecting the series to limit relative expansive movement, links pivoted at one end to one of the leaves of one series, and yielding means connected with the links to minimize rebound of the series having the last named leaf.

21. In combination, a chassis frame, a leaf spring, a lever pivotally connected at one end to the frame and intermediately to one end of the leaf spring, the other end of the leaf spring being connected with the frame, means to connect the leaf spring intermediately to an axle, and an abutment on the lever engaging and constituting the point about which flexure of said spring occurs upon relative movement of the frame and axle.

22. In combination, a chassis frame, a leaf spring, a lever pivotally connected at one end to the frame and intermediately to one end of the leaf spring, the other end of the leaf spring being connected with the frame, means to connect the leaf spring intermediately to an axle, and an abutment connected with the lever and engaging and constituting the point about which flexure of said spring occurs upon relative movement of the frame and axle toward each other.

23. In combination, a chassis frame, a leaf spring, a lever pivotally connected at one end to the frame and intermediately to one end of the leaf spring, the other end of the leaf spring being connected with the frame, means to connect the leaf spring intermediately to an axle, and an abutment connected with the lever and engaging and constituting the point about which flexure of said spring occurs upon relative movement of the frame and axle away from each other.

24. In combination, a chassis frame, a leaf spring, a lever pivotally connected at one end to the frame and intermediately to one end of the leaf spring, the other end of the leaf spring being connected with the chassis frame, means to connect the leaf spring intermediately to an axle, an abutment on the lever engaging and constituting the point about which flexure of said spring occurs upon relative movement of the frame and axle toward each other, and means yieldingly holding the abutment against movement away from the spring.

25. In combination, a chassis frame, a leaf spring, a lever pivotally connected at one end to the frame and intermediately to one end of the leaf spring, the other end of the leaf spring being connected with the chassis, means to connect the leaf spring intermediately to an axle, an abutment on the lever engaging and constituting the point about which flexure of the spring occurs upon relative movement of the frame and axle toward each other, means yieldingly pressing the abutment toward the spring, and a second abutment connected with the lever and engageable with the spring upon relative movement of the frame and axle away from each other.

26. In combination, a chassis frame, a heavier leaf spring, a lever pivotally connected at one end to the frame and intermediately to one end of the leaf spring, the other end of the leaf spring being connected with the frame, means to connect the leaf spring intermediately to an axle, and a lighter leaf spring constructed to oppose the first spring and connected at one end to the other end of the lever and connected intermediately with the axle.

Signed at Los Angeles, California, this 28th day of March, 1921.

CLABEORN P. RANDOLPH.

Witnesses:
GEORGE H. HILES.
L. BELLE WEAVER.